United States Patent
Gao et al.

(10) Patent No.: US 10,922,572 B2
(45) Date of Patent: Feb. 16, 2021

(54) ADAPTIVE AUTO METER DETECTION METHOD BASED ON CHARACTER SEGMENTATION AND CASCADE CLASSIFIER

(71) Applicant: Harbin Institute of Technology, Harbin (CN)

(72) Inventors: Huijun Gao, Harbin (CN); Ming Yi, Harbin (CN); Jinyong Yu, Harbin (CN); Fengyu Guo, Harbin (CN)

(*) Notice: Subject to any disclaimer, the term of this patent is extended or adjusted under 35 U.S.C. 154(b) by 385 days.

(21) Appl. No.: 16/144,845

(22) Filed: Sep. 27, 2018

(65) Prior Publication Data
US 2019/0095739 A1     Mar. 28, 2019

(30) Foreign Application Priority Data
Sep. 27, 2017   (CN) .................. 201710891277.1

(51) Int. Cl.
*G06K 9/32*     (2006.01)
*G06N 3/04*     (2006.01)
(Continued)

(52) U.S. Cl.
CPC ............... *G06K 9/32* (2013.01); *B60K 35/00* (2013.01); *B60K 37/02* (2013.01); *G01D 18/002* (2013.01); *B60K 2370/176* (2019.05); *B60K 2370/21* (2019.05); *B60K 2370/60* (2019.05); *B60K 2370/95* (2019.05); *G06K 2209/01* (2013.01); *G06K 2209/03* (2013.01); *G06N 3/0454* (2013.01); *G06N 20/00* (2019.01); *G06T 2207/20084* (2013.01)

(58) Field of Classification Search
CPC .. G06K 9/32; G06K 2209/03; G06K 2209/01; B60K 35/00; B60K 37/02; B60K 2370/60; B60K 2370/95; B60K 2370/176; B60K 2370/21; B60K 2209/03; G01D 18/002; G06N 3/0454; G06N 20/00; G06T 2207/20084
See application file for complete search history.

(56) References Cited

U.S. PATENT DOCUMENTS

2018/0214105 A1*   8/2018   Anavi .................. G06N 7/005

* cited by examiner

*Primary Examiner* — Kenny A Cese
(74) *Attorney, Agent, or Firm* — Novoclaims Patent Services LLC; Mei Lin Wong

(57) ABSTRACT

An adaptive automobile meter detection method based on character segmentation cascade classifier which processes threshold segmentation, morphology and connected components analysis on the original image; extracts the pointer based on the contour analysis method, establishes a pointer information list; constructs a character segmentation cascade classifier by combining a HOG/SVM character segmentation classifier, a character filter and a CNN digit classifier. The character segmentation cascade classifiers is used to identify the digit character area of the automobile meter. Region analysis is performed to extract tick marks based on the center of the digit character area. The angular position corresponding to the tick mark is determined. The response value corresponding to the pointer is determined by establishing the Newton interpolation linear description relationship between the pointer angle and the response value and then the meter is classified as pass or fail. The invention is suitable for the field of visual inspection of automobile meter pointers.

20 Claims, 7 Drawing Sheets

(51) Int. Cl.
*G06N 20/00* (2019.01)
*B60K 37/02* (2006.01)
*B60K 35/00* (2006.01)
*G01D 18/00* (2006.01)

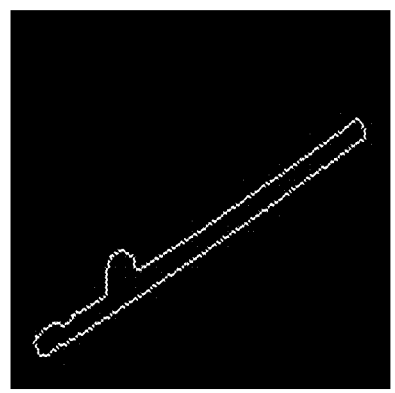 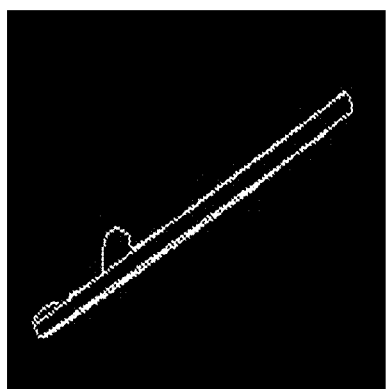
(a) (b)
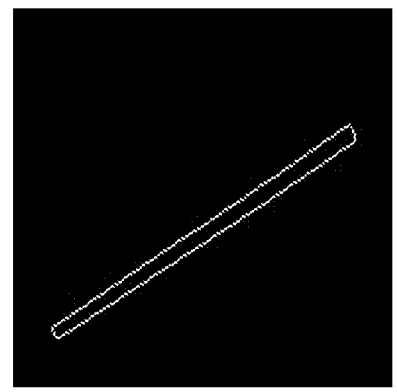 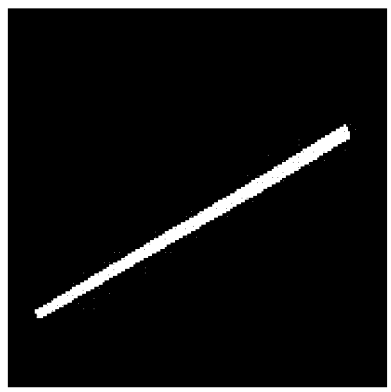
(c) (d)
FIG. 3

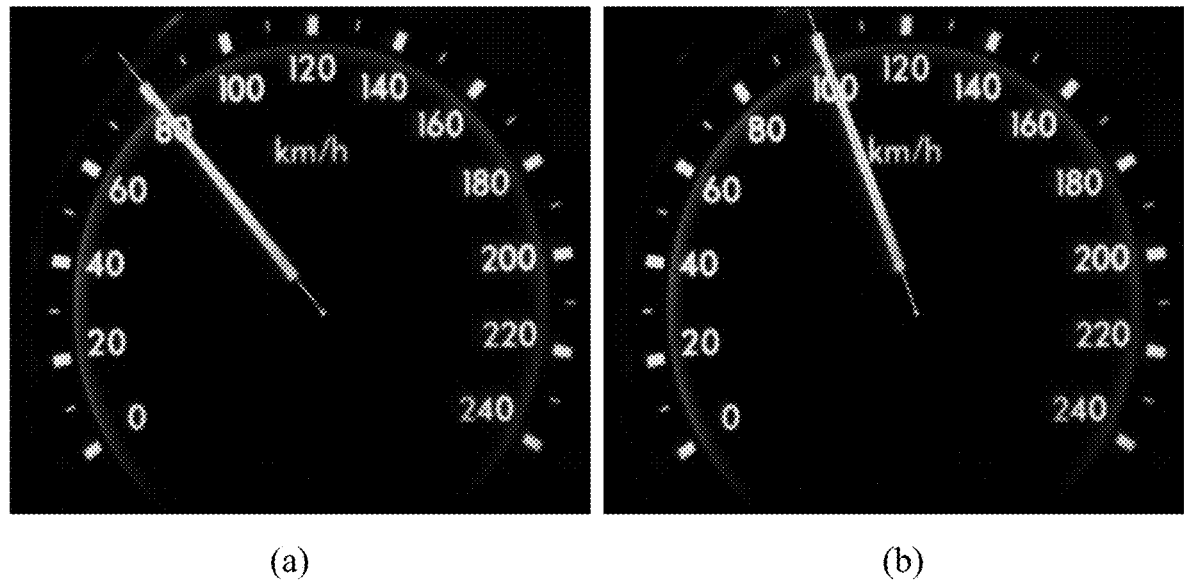
(a)                                             (b)
FIG. 4
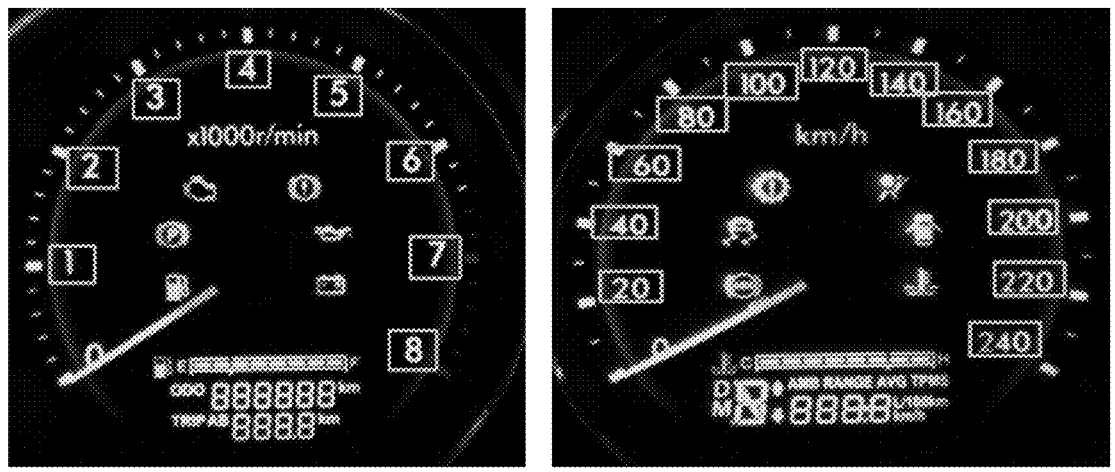
FIG. 5                                     FIG. 6

Ctr. S: Search Center

Center D: Center of Digital Character Area

ADAPTIVE AUTO METER DETECTION METHOD BASED ON CHARACTER SEGMENTATION AND CASCADE CLASSIFIER

CROSS REFERENCE OF RELATED APPLICATION

This application claimed priority of the application number 201710891277.1, filing date Sep. 27, 2017 filed in China. The contents of these specifications, including any intervening amendments thereto, are incorporated herein by reference.

BACKGROUND OF THE PRESENT INVENTION

Field of Invention

The present invention relates to meter pointer visual inspection technology for automobile meter.

Description of Related Arts

Automobile meter is a human-machine interaction interface between a car and a driver, which is an important part of the car. The response accuracy of an automobile meter to a signal will directly affect safety and comfort during driving. The detection of the pointer on the mechanical pointer meter is one of the most important detection items in the meter detection. The response accuracy of the meter pointer in response to the speed command signal directly determines whether the quality of the meter produced is good or bad. Therefore, the accurate measurement of the pointer response requires detection algorithm with high degree of precision. In addition, manufacturers of automobile meters will produce different types and batches of meters, so it is hoped that the detection algorithm has good versatility and adaptability.

For pointer inspection of automobile meter, the workflow of the vision inspection system for automobile meter is as follows:

The automobile instrument inspection system sends a CAN signal to the automobile instrument through an industrial computer. The instrument pointer responds to the signal after receiving the signal. After the rotation of pointer is completed, an industrial camera performs image acquisition and processing of the instrument to obtain a reading for actual rotation of the current meter, and compare with the given signal, calculate an error between the actual reading and the given signal to determine whether the response of the instrument to the signal meets the precision requirements.

In the detection phase of the automobile instrument inspection system, the basic steps include image acquisition, pointer extraction, tick marks positioning, and pointer reading calculation. Wherein the pointer extraction is designed to obtain the pointer angle by fitting the pointer position. The traditional pointer extraction method mainly uses the Hough line fitting to extract the line of the pointer position, for example, the literature 'Automatic Calibration of Analog and Digital Measuring Instruments Using Computer Vision' (Chinese translation of 'Automatic Calibration of Analog and Digital Measuring Instruments Using Computer Vision') uses the frame subtraction method to detect the position of the pointer by segmenting the image threshold, using the thinning algorithm and using Hough transform to detect pointer position; the literature 'Computer Vision applied to the automatic calibration of measuring instruments' (Chinese translation of 'Computer Vision applied to the automatic calibration of measuring instruments') first calculates the gradient of an image, binarizes the image and then uses Hough line fitting to detect the pointer line; the literature 'Machine Vision Based Automatic Detection Method of Indicating Values of a Pointer Gauge' (Chinese translation of 'Machine Vision Based Automatic Detection Method of Indicating Values of a Pointer Gauge') uses an edge map to obtain the entire image in which Hough line fitting is used on the edge of the pointer, and etc. None of the above methods considers the deviation caused by line fitting when the pointer and dial numbers overlap. In this case, the line fitted by the above methods will have a certain range of deviation from the center line of the pointer, and the measurement accuracy is not high.

Tick mark positioning is used to determine the position of the scale point (tick mark) in the image coordinate system and then determine the correspondence relationship between the angle and the speed. The literature 'Machine Vision Based Automatic Detection Method of Indicating Values of a Pointer Gauge' (Chinese translation of 'Machine Vision Based Automatic Detection Method of Indicating Values of a Pointer Gauge') uses the method of boundary filling to extract the tick mark area in which the tick mark area is determined by the improved center projection method in the polar coordinate system, and the angular position of the main tick mark is determined according to the angular frequency in the angle histogram. In this method, the default tick marks are distributed over a ring gray-scale connected area. For an independently distributed meter tick mark, this method obviously cannot extract a valid scale area. The literature 'Automatic Calibration of Analog and Digital Measuring Instruments Using Computer Vision' (Chinese translation of 'Automatic Calibration of Analog and Digital Measuring Instruments Using Computer Vision') converts the Cartesian coordinate system to a polar coordinate system, and transforms the scale of the ring shape into a line for processing. This method has a uniform scale distribution by default, and the relationship between the angle and the speed can be obtained by detecting the zero point and the maximum tick mark. However, this method is difficult to be applied in automobile meter detection where there are two dials on the dashboard. Since parallaxes exist in each dial when the camera performs detection on each dial, the tick marks on the dial are not evenly distributed. The relationship between the angle and the speed obtained according to this method will have a greater error. In addition, the various meter detection methods as described above may have a better detection result for a specific single dial meter. However, when the shape of the meter or the background of the meter change, changes to a large number of parameters in the algorithm are required. This is because the instrument features selected by the above algorithm are not universal. In addition, the speed value algorithm corresponding to the tick mark cannot be automatically read from the dial, and requires manual assignment, so the automation degree of theses algorithms are not high.

In summary, the existing problems of the existing meter detection systems in the field of automobile dashboard testing are summarized as follows:

1) The traditional methods, which are based on frame subtraction method and then thinning algorithm as well as fitting the line by Hough transform to obtain the pointer line, has low precision;

2) The traditional methods, which are mainly used to detect a meter with a single dial and a single background, have poor adaptability and low precision level for automobile meter with two dials and complicated background;

3) The traditional methods have poor adaptability, which fail to adaptively detect different types of meters manufactured by instrument manufacturers and the generalization ability of the algorithm is low;

4) The traditional methods cannot automatically obtain the reading of the meter scale, and need manual assignment. The degree of automation is low.

SUMMARY OF THE PRESENT INVENTION

An object of the present invention is to solve the problems existing in the field of automobile meter detection of automobile meter detection systems, which provides an adaptive automobile meter detection method based on character segmentation cascade classifier.

An adaptive automobile meter detection method based on character segmentation cascade classifier, comprising the following steps of:

Step 1: if the input signal value of a testing meter is i, collect a color image of an entire dashboard as an original image, preprocessing a ROI (Region of Interest) image in the original image to obtain a binary image, extracting the precise connected component of pointer in the binary image by contour analysis, processing thinning operation and fitting line for the connected component of the pointer to obtain a fitting pointer line corresponding to this pointer input signal value of the pointer at current position and obtain a pointer angle $\Delta \varphi^j$ of the pointer at the current position according to an angle of the fitting pointer line;

Step 2: adding signal value i=i+Q, determining if i is less than or equal to a maximum scale value of the testing meter. If i is less than or equal to the maximum scale value of the testing meter, storing the fitting pointer line corresponding to the input signal value of the pointer at the current position and repeat step (1); if i is not less than or equal to a maximum scale value of the testing meter, go to step (3), where an initial value of i is 0, Q refers to the display difference between adjacent main tick marks;

Step 3: utilizing a character segmentation cascade classifier to detect the ROI image with a multi-scale detection method and an image of digit character area on the testing meter is obtained, the character segmentation cascade classifier is constructed by a cascade combination of a HOG/SVM character segmentation two-class classifier, a character filter and a CNN digit classifier;

Step 4: connecting a rotation center of the pointer with a center of each digit character area and making an extension line, a length of the extension line has a fixed length $\lambda$, defining an end point of each extension line as a search center to search each main tick mark corresponding to each digit character area respectively; setting each search center as a center of circle, searching for the main tick mark corresponding to each digit character area in the circle having a radius R, obtaining the main tick mark corresponding to each digit character area;

Step 5: defining the pointer angle as an independent variable, the response value of the pointer as a dependent variable, the angle of the main tick mark and the displayed value corresponding to the angle of the main tick mark as an interpolation point, using Newton interpolation polynomial to establish a linear Newton interpolation relationship of the testing meter, substituting the pointer angle $\Delta \varphi^j$ into the linear description relationship of Newton interpolation and obtaining the response value of the pointer corresponding to each of the fitting lines stored in step (2), the angle of the main tick mark is: an angle between a connecting line of the main tick marks and a horizontal axis of a coordinate system with a positive direction, the connecting line of the main tick marks is a connecting line between a coordinate of the main tick marks in the coordinate system, whose origin is the rotation center of the pointer, and the coordinate origin;

Step 6: calculating an error value between each input signal value and the response value of the pointer in testing meter, if the error value is smaller than a standard threshold of error, the testing meter is classified as pass, if the error value is bigger than the standard threshold of error, the testing meter is classified as fail.

The present invention has the following advantageous technical effects:

1. The present invention provides an adaptive automobile meter detection method based on character segmentation cascade classifier. There is no need to change a large number of parameters during the detection process. The adaptability is high and the flexibility is high. In the training phase of the actual application of the detection system, a robust and highly reliable for character segmentation cascaded two-class classifier is obtained. The classifier can be used to detect the digit character area on the instrument and use area as a reference to extract the tick marks. Meanwhile, the angle of the main tick mark and the corresponding speed value are obtained.

2. The method of the present invention includes pointer image extraction method by contour analysis. Compared with the traditional Hough line fitting method, the precision of the extracted pointer can be ensured to the greatest extent, and hence the recognition accuracy is ensured. FIG. 2 shows that the pointer overlaps with the digit area after processing binarization of the dashboard image. FIG. 3 and FIG. 4 show that the pointer extraction algorithm can remove the interference introduced by the digit elements, thus accurately fit the meter pointer, and improve the accuracy of the algorithm.

3. The method of the present invention also includes a character recognition method based on character segmentation cascade two-class classifier. Compared with common HOG/SVM classifiers, the present invention has high robustness and wide application range. FIG. 6 and FIG. 8 show that the trained cascade classifier can correctly detect different types of speedometers. FIG. 5 and FIG. 7 show that the trained cascade classifier can correctly detect different types of tachometers. These results show that the present invention employs an algorithm which is robust and has a wide range of applications.

4. The method of the invention can be used to detect the majority of automobile meters, including automobile meters with different shapes and distribution structures, and can provide accurate detection in a relatively complicated background. The method has high algorithm robustness and wide application range.

5. In the present invention, the accuracy of the linear relationship between the pointer angle of the automobile meter and angle's corresponding response value established by Newton interpolation relationship is high. In a typical experimental situation: under dark environment, the resolution of the acquired image is 1280*628. For the same automobile meter, the relative error comparison between the traditional method and the present invention is shown in FIG. 14 of the drawings. (An industrial camera with a resolution of 1280*628 and a host computer with a 2.5 GHz INTEL Core i5 processor and 8 G memory are used for carrying out the method of the present invention)

6. The adaptive automobile meter detection method based on character segmentation cascade classifier of the present invention can also be applied to the detection and calibration process of single dial instruments with different shapes.

BRIEF DESCRIPTION OF THE DRAWINGS

FIG. 3 is a schematic diagram of each intermediate image in the process of extracting a connected component of pointer component according to embodiment 2 of the present invention, wherein (a) is a schematic diagram of the contour of the rough image of the extracted pointer, (b) is a schematic diagram of the contour fitting line, (c) is a schematic diagram of the maximum inner contour, and (d) is a schematic diagram of the pointer connected component;

FIG. 4 is a graphical illustration of fitting pointer line obtained by least squares fitting method in step (3) according to embodiment 1 of the present invention, wherein (a) refers to an instrument pointer image corresponding to a speed signal of 80 km/h, and (b) refers to an instrument pointer image corresponding to a speed signal of 100 km/h;

FIG. 5 illustrates the character area obtained by cascade classifier with high robustness for a testing tachometer according to embodiment 8 of the present invention;

FIG. 6 illustrates the character area obtained by cascade classifiers with high robustness for a testing speedometer according to embodiment 8 of the present invention;

DETAILED DESCRIPTION OF THE PREFERRED EMBODIMENT

Figure 1:
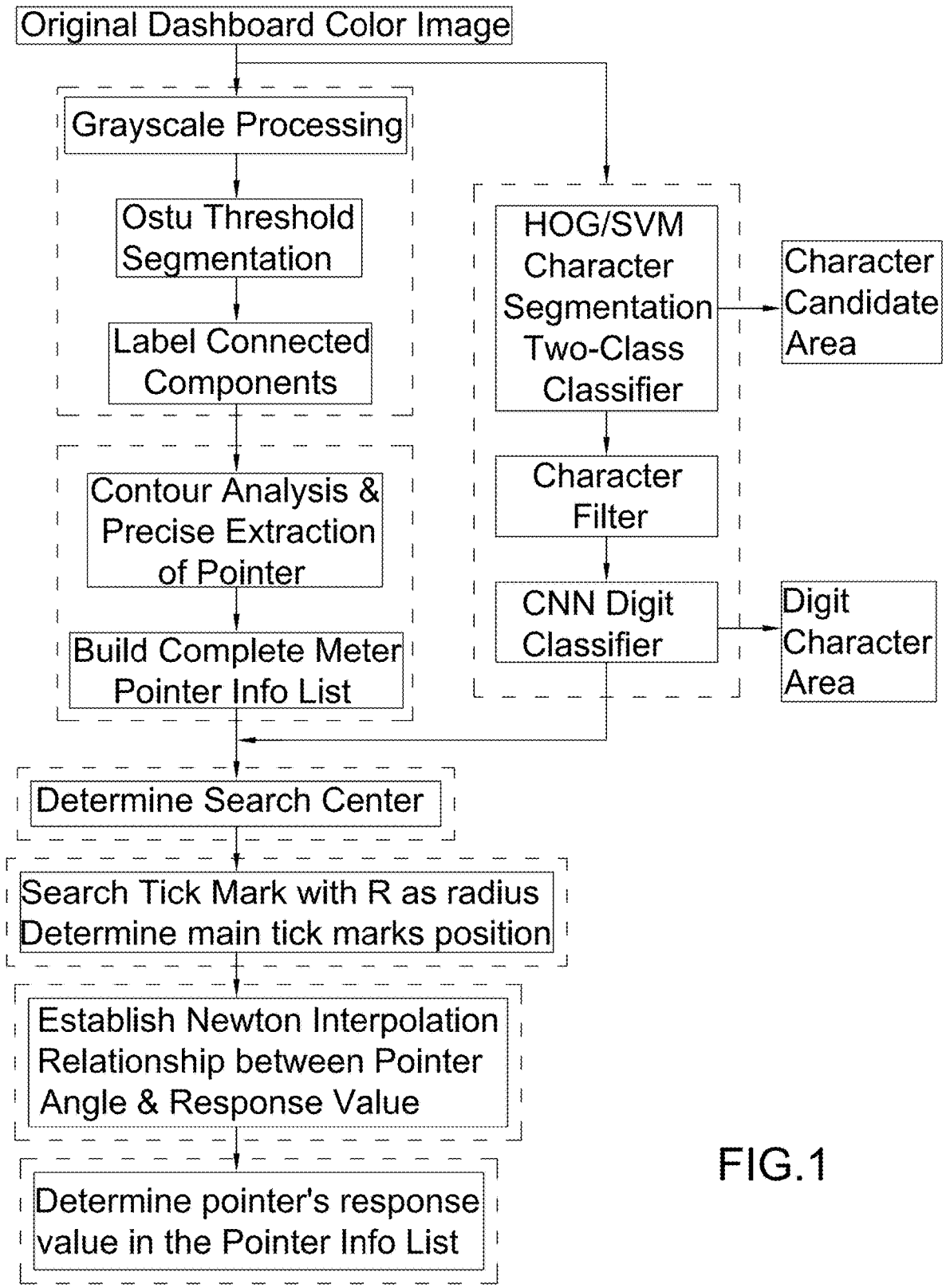
FIG. 1 is a flowchart of an adaptive automobile meter detection method based on character segmentation cascade classifier according to a preferred embodiment of the present invention.

Preferred Embodiment 1: Referring to FIG. 1 and FIG. 4, an adaptive automobile meter detection method based on character segmentation cascade classifier according to this preferred embodiment of the present invention is illustrated. The method comprises the following steps:

Step 1: if an input signal value of testing meter is i, a meter pointer responses to the input signal and rotate to obtain a response value, then collect a color image of an entire dashboard as an original image, obtain ROI (Region of Interest) image of the testing meter (such as speedometer or tachometer) in the original image, perform gray-scale processing of the ROI image and threshold segmentation by using Ostu algorithm to obtain a binary image, perform binarization marking for each pointer connected components in the binary image and then proceed to Step 2;

Step 2: perform precise extraction of the meter pointer for the binary image after binarization marking by using contour analysis based method, obtain an image of the pointer connected components and then proceed to Step 3;

Step 3: process thinning operation for the image of the pointer connected component area to obtain thinning results, fit the fitting results using the least squares line fitting method, obtain a fitting line corresponding to the response value of the pointer at a current position, determine an angle of the fitting line $\Delta\varphi^j$ based on the fitting line and proceed to Step 4;

Step 4: adding the signal value i=i+Q, determine if i is less than or equal to a maximum scale value of the testing meter, if yes, then store the fitting line corresponding to the response value of the pointer at the current position and go back to Step (1), if no, then use M number of stored fitting lines to build a meter pointer information list and then execute Step 5, where an initial value of i is 0, M is an positive integer, Q is the difference between adjacent main scales;

the meter pointer information list includes the following information:

M number of input signal values, M number of pointer response values, the slope of the fitting line corresponding to each response value in the image coordinate system, M number of angles of the fitting line, more than two intersection points of two intersecting fitting lines and M number of pointer angles, where the pointer angle refers to a corresponding angle of the fitting line in the coordinate system which uses the rotation center of the meter pointer as the origin;

Step 5: design a character segmentation cascade classifier with strong robustness (strong robustness refers to one classifier can recognize characters in the image of different types of automobile meters), process multi-scale detection of the ROI image and obtain a digit character area on the testing meter, the character segmentation cascade classifier is constructed by a cascade combination of a HOG/SVM character segmentation two-class classifier, a character filter and a CNN (Convolutional Neural Network) digital classifier;

the HOG/SVM character segmentation two-class classifier is used for multi-scale detection of ROI image to obtain multiple digit character candidate areas, the character filter is used to divide the elements in each of the digit character candidate areas and filter out non-character elements to obtain character elements in each of the digit character candidate areas, the CNN digital classifier is used to identify the character elements in each of the digit character candidate areas and obtain reading value of each of the digit character candidate areas, then utilize the reading value of each of the digit character candidate areas for screening the digit character candidate areas to obtain digit character areas;

Step 6: search for the main tick mark of the meter based on the digit character area, connecting a rotation center of the pointer to a center of each digit character area and making an extension line, a length of the extension line has a fixed length λ, defining an end point of each extension line as a search center of the tick marks area corresponding to each digit character area respectively; setting each search center as a center of circle, searching for the main tick marks corresponding to each digit character area in the circle having a radius R, obtaining the main tick mark of each digit character area digit character;

Step 7: defining the pointer angle as an independent variable, the response value of the pointer as a dependent variable, the angle of the main tick marks and the display value corresponding to the angle of the main tick mark as an interpolation point, using Newton interpolation polynomial to establish a linear description relationship of Newton interpolation of the testing meter, substituting the pointer angle $\Delta\varphi^j$ and utilize the linear description relationship to obtain M number of response value of the pointer in the meter pointer information list, the angle of the main tick mark is: an angle between a connecting line of the main tick marks and a horizontal axis of a coordinate system with a position direction, the connecting line of the main tick marks is a connecting line between coordinate of the main tick marks in the coordinate system, whose origin is the rotation center of the pointer, and the coordinate origin;

Step 8: calculating an error value between each input signal value and the response value of the pointer corresponding to each input signal value of the testing meter respectively, if the error value is smaller than a standard threshold of error, the testing meter is classified as pass, if the error value is bigger than the standard threshold of error, the testing meter is classified as fail. According to this embodiment, the standard threshold of error is set according to 'GB/T 12548-2016 Automobile Speedometer, Tachometer Inspection and Correction Method'.

M number of pointer positions are corresponding to M number of pointer input signal values, M number of fitting lines and M number of pointer response values. In Step 8, error values of each of the M number of pointer positions, which are corresponding to M the pointer input signal values, and the M number of response values are calculated respectively.

According to this embodiment, 1) the original image is processed by threshold segmentation, morphological and connected domain analysis; 2) pointer extraction method based on contour analysis is realized and the meter pointer information list is established; 3) the character segmentation cascade classifier is constructed by a cascade combination of a HOG/SVM character segmentation two-class classifier, a character filter and a CNN digit classifier and is capable of obtaining the digit character areas on the testing meter and the these characters' reading value corresponding to the main tick mark in the digit character area; 4) the character segmentation cascade classifier is adopted to identify the digit character areas of the meter; 5) region analysis based on the center of the digit character areas is used to determine the angular position corresponding to the tick mark; 6) a linear Newton interpolation description relationship between the angle of the meter pointer and the response value is established to determine the response value of the pointer. This embodiment is suitable for use in the field of visual inspection for automobile meter pointers.

Figure 2:
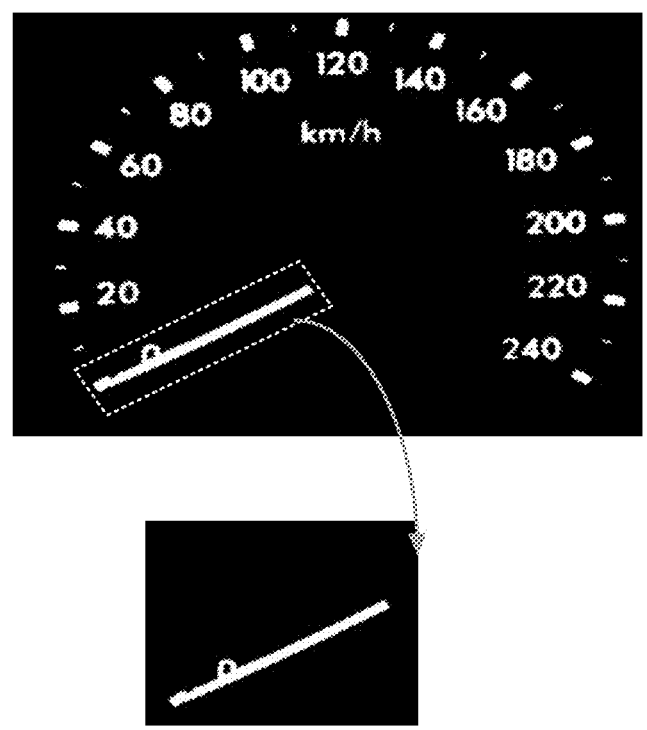
FIG. 2 is a schematic diagram of a process of extracting a connected component of pointer component according to embodiment 2 of the present invention.
Figure 7:
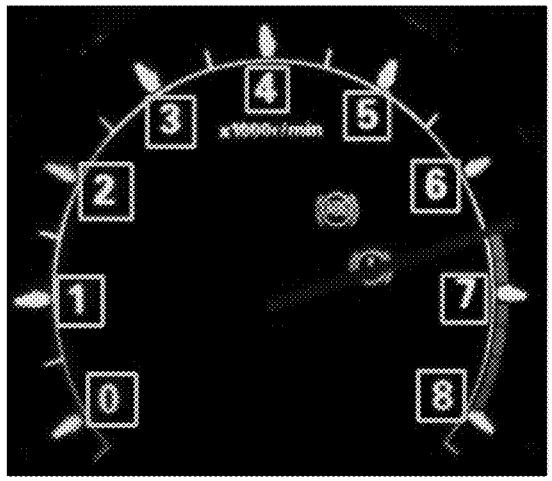
FIG. 7 illustrates the character area obtained by cascade classifiers with high robustness for different types of tachometers in embodiment 8 of the present invention.
Figure 8:
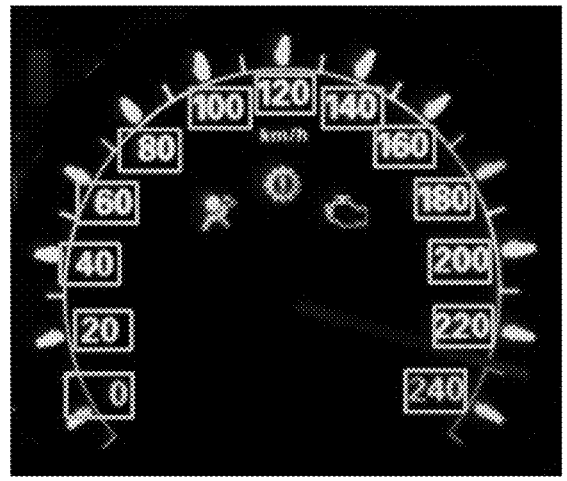
FIG. 8 illustrates the character area obtained by cascade classifiers with high robustness for different types of speedometers according to embodiment 8 of the present invention.
Figure 9:
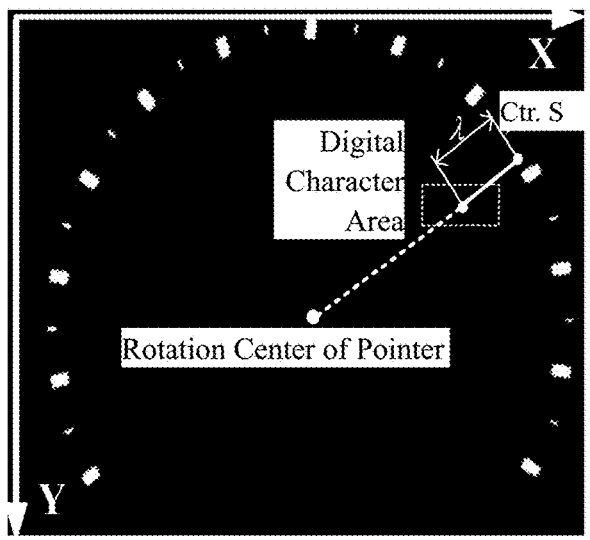
FIG. 9 is an exemplary illustration of determining a search center in Embodiment 9 of the present invention.
Figure 10:
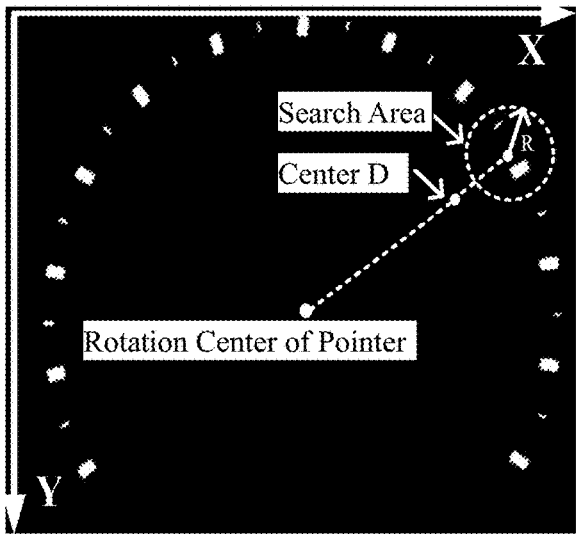
FIG. 10 an exemplary illustration of search area in Embodiment 9 of the present invention.
Figure 11:
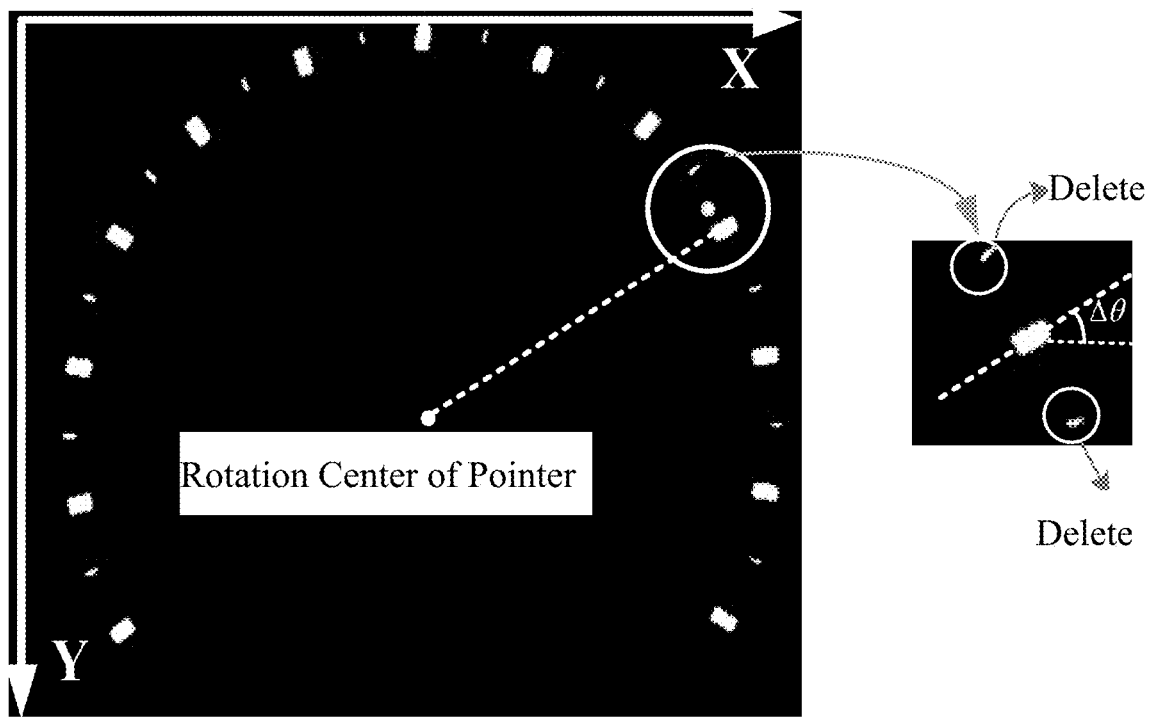
FIG. 11 illustrates a region analysis of searching main tick marks in Embodiment 9 of the present invention.
Figure 12:
FIG. 12 illustrates the main tick marks obtained from extraction in Embodiment 9 of the present invention.

Preferred Embodiment 2: Referring to FIG. 2 and FIG. 3 of the drawings, an adaptive automobile meter detection method based on character segmentation cascade classifier according to this embodiment is illustrated. According to this embodiment, the adaptive automobile meter detection method based on character segmentation cascade classifier as described in Embodiment 1 is further explained. According to this embodiment, the step of obtaining the image of the pointer connected components comprises the following steps:

Process rough extraction of the meter pointer for the binary image with the largest area after binarization to obtain a rough extracted image of the meter pointer;

Extract a contour of the rough extracted image of the meter pointer to obtain a contour image;

Process fitting line operation of the contour image by PPHT (Progressive Probabilistic Hough Transform) algorithm to obtain the contour image with contour fitting line; and Search the contour image with contour fitting line for an inner contour with the largest area and extracting the connected component corresponding to the inner contour with the largest area as the connected component of the meter pointer.

Preferred Embodiment 3: Referring to FIG. 4 of the drawings, an adaptive automobile meter detection method based on character segmentation cascade classifier according to this embodiment is illustrated. According to this embodiment, the adaptive automobile meter detection method based on character segmentation cascade classifier as described in Embodiment 1 is further explained. According to this embodiment, in the Step 4, the k number of two intersection points $(x_k, y_k)$ of two intersecting fitting lines is obtained by the following formula:

$$\begin{cases} x_k = \dfrac{b_2 - b_1}{k_1 - k_2} \\ y_k = \dfrac{k_1 b_2 - k_2 b_1}{k_1 - k_2} \end{cases}$$

(both of the slopes $k_1$ and $k_2$ of the two intersecting fitting lines exist)

$$\begin{cases} x_k = b_2 \\ y_k = k_1 b_2 + b_1 \end{cases}$$

(the slopes $k_2$ of one of the intersecting fitting lines does not exist)

Wherein $b_1$ and $b_2$ are the intercepts of the two intersecting fitting lines respectively, $k_1$ and $k_2$ are the slopes of the two intersecting fitting lines respectively;

The average of the intersection points of N number of fitting lines is used as the rotation center $(x_{center}, y_{center})$ of the meter pointer, and the rotation center $(x_{center}, y_{center})$ of the meter pointer is obtained by using the following formula:

$$(x_{center}, y_{center}) = \left( \dfrac{\sum_{k=1}^{N} x_k}{N}, \dfrac{\sum_{k=1}^{N} y_k}{N} \right)$$

Wherein N and k are both positive integer.

Figure 13:
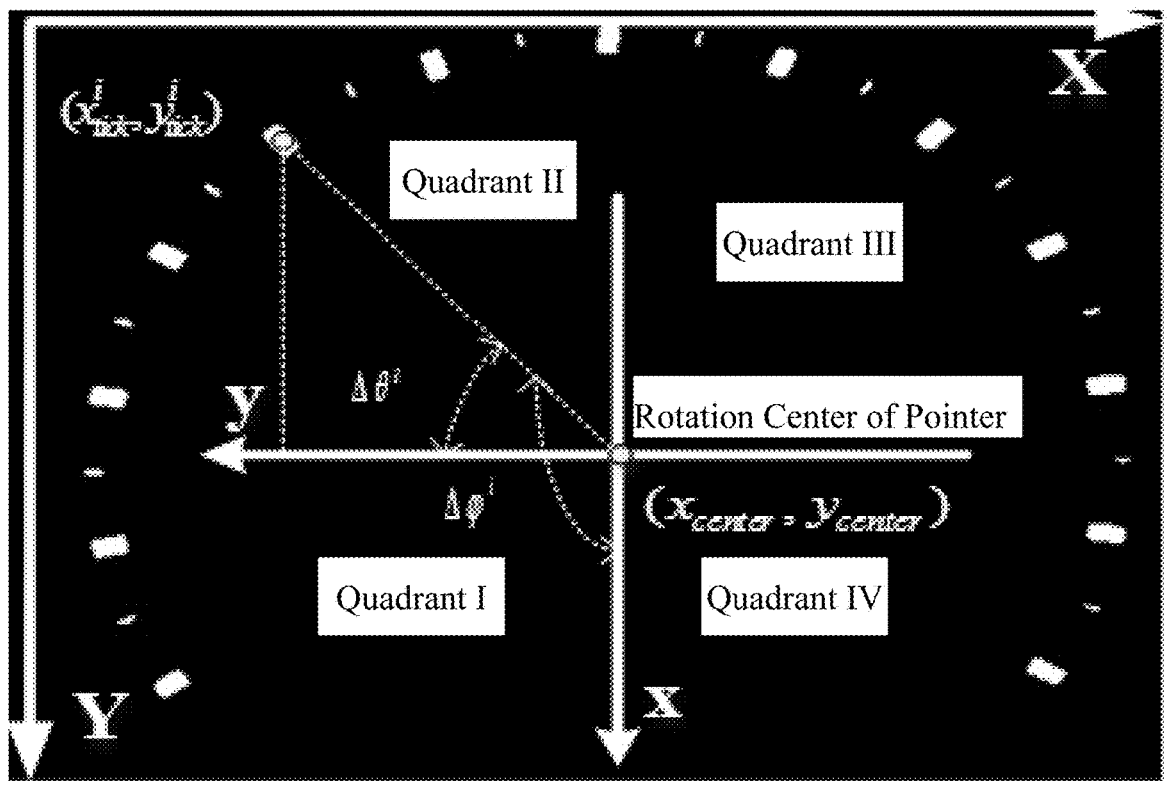
FIG. 13 illustrates the coordinate system established by using pointer rotation center ($x_{center}$, $y_{center}$) as the coordinate origin; ($x_{tick}^i$, $y_{tick}^i$) refers to the coordinates of the i-th tick mark centroid in the image coordinate system, $\Delta\theta^i$ refers to the acute angle between the line formed by ($x_{center}$, $y_{center}$) and ($x_{tick}^i$, $y_{tick}^i$) in the image coordinate system and the horizontal axis; $\Delta\varphi^i$ refers to the angle $\Delta\theta^i$ in the coordinate system established by using pointer rotation center ($x_{center}$, $y_{center}$) as the coordinate origin.
Figure 14:
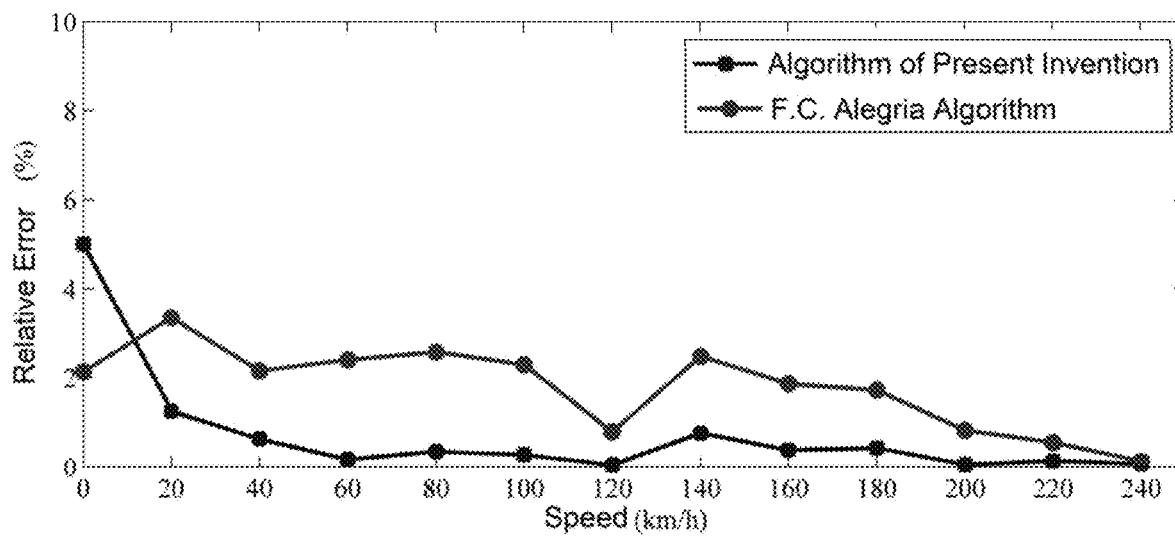
FIG. 14 illustrates an error comparison chart between the algorithm in the literature 'Automatic Calibration of Analog and Digital Measuring Instruments Using Computer Vision' (Chinese translation of 'Automatic Calibration of Analog and Digital Measuring Instruments Using Computer Vision') and the algorithm of this invention with respect to manual reading of the instrument.

Preferred Embodiment 4: Referring to FIG. 13 of the drawings, an adaptive automobile meter detection method based on character segmentation cascade classifier according to this embodiment is illustrated. According to this embodiment, the adaptive automobile meter detection method based on character segmentation cascade classifier as described in Embodiment 1 is further explained. According to this embodiment, the angle of the fitting line $\Delta\theta^j$ corresponding to the position of the j-th pointer is obtained by the following formula:

$$\Delta\theta^j = \arctan(|k^*|) * \frac{180°}{\pi}$$

Where k* is the slope of the j-th fitting line;

The pointer angle $\Delta\varphi^j$ is obtained by the following formula:

$$\Delta\varphi^j = \begin{cases} 90° - \Delta\theta^j & [(x_{line}^j, y_{line}^j) \in \text{Quadrant } I] \\ 90° + \Delta\theta^j & [(x_{line}^j, y_{line}^j) \in \text{Quadrant } II] \\ 270° - \Delta\theta^j & [(x_{line}^j, y_{line}^j) \in \text{Quadrant } III] \\ 270° + \Delta\theta^j & [(x_{line}^j, y_{line}^j) \in \text{Quadrant } IV] \end{cases}$$

Where ($x_{line}^j$, $y_{line}^j$) is the coordinates of an arbitrary point on the fitting line, Quadrant is the quadrant.

Preferred Embodiment 5: According to this embodiment, the adaptive automobile meter detection method based on character segmentation cascade classifier as described in Embodiment 1 is further explained. According to this embodiment, in step 5, the HOG/SVM character segmentation two-class classifier is obtained by the followings:

Step 5-1: making a training sample set that includes a positive sample set and a negative sample set, the positive sample set comprises sample images of digit character area in different types of dashboard images, the negative sample set comprises sample images of pointer elements, indicator light elements and tick mark elements in different types of dashboard images;

Step 5-2: normalize the size of all sample images in the training sample set to obtain a training sample set with sample images of the same size;

Step 5-3: extract the HOG feature for each sample of the same size in the training sample set, generate a feature vector matrix, label positive sample as 1 and negative sample as 0 to obtain labels for all samples;

Step 5-4: Input the feature vector matrix and the labels for all samples into a linear SVM and perform training to obtain the HOG/SVM character segmentation two-class classifier.

In practical operation, for tachometers, the sample image size is normalized to 32*32 pixels; for speedometers, the sample image size is normalized to 48*32 pixels. The unit used is pixel unless specified.

Preferred Embodiment 6: According to this embodiment, the adaptive automobile meter detection method based on character segmentation cascade classifier as described in Embodiment 1 is further explained. According to this embodiment, in the step 5, the character filter employs the following filtering method:

Perform threshold segmentation for each digit character candidate area to obtain a plurality of connected component elements;

Perform labelling for each of the connected component elements and find the minimum enclosing rectangle of each of the contour of connected component elements;

Perform screening for each of the connected component elements respectively to obtain the character elements in each of the digit character candidate areas, The screening conditions are as follows:

Each connected component element has a height greater than 12 pixels and smaller than 30 pixels;

The pixel ratio of the connected components element to its minimum enclosing rectangle is less than 0.8; and The aspect ratio of the minimum enclosing rectangle of the connected component element is greater than 0.1 and smaller than 0.85.

Preferred Embodiment 7: According to this embodiment, the adaptive automobile meter detection method based on character segmentation cascade classifier as described in Embodiment 1 is further explained. According to this embodiment, in the step 5, the CNN digital classifier is obtained by the followings:

Build a digit data set of automobile meter, the digit data set includes a training set and a testing set;

Label each image in the training set and in the testing set respectively to obtain 10 classification image sets;

Normalize the image size in the training set to 28*28 pixel;

Input the testing set and the normalized training set into the CNN network and perform training to obtain the CNN digit classifier;

The CNN network employs a LeNet5 framework and has 7 layers.

The first layer is the input layer, which is a 28*28 image input layer.

The second layer is a convolutional layer. The convolutional kernel has a size of 3*3, the number of convolutional kernel is 32. Relu (Rectified Linear Units) is employed to activate activation function.

The third layer is a pooling layer, which uses max pooling (maximum pooling) to reduce the feature vector of the convolutional layer output. The size of the sampling kernel is 2*2.

The fourth layer is a convolutional layer. The convolutional kernel has a size of 3*3, the number of convolutional kernels is 64. Relu is employed to activate activation function.

The fifth layer is a pooling layer, which is the same as the third layer.

The sixth layer and the seventh layer are both fully connected layers. The sixth layer has 120 neurons and employs Relu to activate activation function. The seventh layer has 10 neurons and employs softmax (multiple logistic regression) for activation.

According to this embodiment, a back-propagation algorithm is used to update the weights and offsets in the CNN, and the two fully-connected layers adopt the dropout (discarding rate) method to suppress the over-fitting phenomenon in the training CNN network. The dropout rate in the fully connection layer of the sixth layer is 0.5, and the dropout rate in the seventh layer is 0.25. In this embodiment, the number of iterations of the training network is 50, the size of the training set is 10000 images, and the size of the testing set is 2000 images. The final recognition accuracy of the CNN network on the testing set is 99.63%.

In practical applications, the number 9 is not present in the automobile dashboard. Therefore, the data set in the present embodiment includes nine numeric classifications for the number 0-8 and the tenth classification consists of other non-digit elements in the automobile meters.

Preferred Embodiment 8: Referring to FIG. 5 to FIG. 8 of the drawings, an adaptive automobile meter detection method based on character segmentation cascade classifier according to this embodiment is illustrated. According to this embodiment, the adaptive automobile meter detection method based on character segmentation cascade classifier as described in Embodiment 1 is further explained. According to this embodiment, in step 5, the specific process of utilizing the reading value of each of the digit character candidate areas for screening the digit character candidate areas is as follows:

Compare each reading value of the digit character candidate areas with the digit set of the testing meter, use the digit character candidate areas whose reading values belong to the digit set of the meter as the digit character area.

In practical applications, if the testing meter is a speedometer (as shown in FIG. 6), the digit set corresponding to the meter is {0 km/h, 20 km/h, . . . 240 km/h}; if the testing meter is a tachometer (as shown in FIG. 5), the digit set corresponding to the meter is {0, 1, . . . , 8}*1000 r/min. The detected digit character area is labeled by a rectangular frame and the center of the rectangular frame is the center of the particular character area.

Preferred Embodiment 9: Referring to FIG. 9 to FIG. 13 of the drawings, an adaptive automobile meter detection method based on character segmentation cascade classifier according to this embodiment is illustrated. According to this embodiment, the adaptive automobile meter detection method based on character segmentation cascade classifier as described in Embodiment 1 is further explained. According to this embodiment, in step 6, coordinates of the search center of each digit character area is obtained by the following method:

Combine the line equation and the circle equation to obtain the coordinates of the two intersection points, and use the coordinates of the intersection point with a greater distance from the rotation center of the meter as coordinates of the search center ($x_{searchcenter}^i$, $y_{searchcenter}^i$)

The line equation is an equation connecting the rotation center of the pointer ($x_{center}$, $y_{center}$) with the center of the digit character area ($x_{boxcenter}^i$, $y_{boxcenter}^i$) as shown in equation (1).

The circle equation is an equation in which the center of the digit character area ($x_{boxcenter}^i$, $y_{boxcenter}^i$) is the center and $\lambda$ is the radius, as shown in equation (2).

$$\begin{cases} \dfrac{y^i - y_{rcenter}}{y_{boxcenter}^i - y_{rcenter}} = \dfrac{x^i - x_{rcenter}}{x_{boxcenter}^i - x_{rcenter}} (x_{boxcenter}^i \neq x_{rcenter}, y_{boxcenter}^i \neq y_{rcenter}) \\ x^i = x_{rcenter}(x_{boxcenter}^i = x_{rcenter}) \\ y^i = y_{rcenter}(y_{boxcenter}^i = y_{rcenter}) \end{cases}$$ (1)

$$(x - x_{boxcenter}^i)^2 + (y - y_{boxcenter}^i)^2 = \lambda^2$$ (2)

$x^i$ is the independent variable of the linear equation, $y^i$ is the dependent variable of the linear equation, and ($x_{rcenter}$, $y_{rcenter}$) is the coordinates of the center of the character area;

in the step 6, a method of searching for the main tick marks corresponding to each digit character area comprises the steps of:

Searching for the largest connected component in the circle area as the i-th main tick mark of the testing meter, and determining the coordinates ($x_{tick}^i$, $y_{tick}^i$) of the centroid of the main tick mark in the image coordinate system as the estimated position of the main tick mark;

The coordinates of the main tick mark are transformed from the image coordinate system to the rectangular coordinate system with the rotation center of the pointer ($x_{center}$, $y_{center}$) as the coordinate origin. The purpose of the transformation is to make the changes of angle become changes with monotonously increase;

In the coordinate system with the rotation center of the pointer as the coordinate origin, the angle of the centroid is obtained by:

$$\Delta\theta^i = \arctan\left(\dfrac{|y_{tick}^i - y_{center}|}{|x_{tick}^i - x_{center}|}\right) * \dfrac{180°}{\pi}$$

$$\Delta\varphi^i = \begin{cases} 90° - \Delta\theta^i & [(x_{tick}^i, y_{tick}^i) \in \text{Quadrant } I] \\ 90° + \Delta\theta^i & [(x_{tick}^i, y_{tick}^i) \in \text{Quadrant } II] \\ 270° - \Delta\theta^i & [(x_{tick}^i, y_{tick}^i) \in \text{Quadrant } III] \\ 270° + \Delta\theta^i & [(x_{tick}^i, y_{tick}^i) \in \text{Quadrant } IV] \end{cases}$$

Where $\Delta\theta^i$ is the acute angle between the line formed by rotation center of the pointer ($x_{center}$, $y_{center}$) and the equivalent centroid ($x_{tick}^i$, $y_{tick}^i$), and the horizontal axis in the image coordinate system; if $x_{tick}^i = x_{center}$, $\Delta\theta^i = 90°$; in the coordinate system with ($x_{center}$, $y_{center}$) as the coordinate origin, $\Delta\varphi^i$ is clockwise as positive.

Preferred Embodiment 10: According to this embodiment, the adaptive automobile meter detection method based on character segmentation cascade classifier as described in Embodiment 1 is further explained. According to this embodiment, in step 7, the specific process of establishing the linear description relationship Newton interpolation of the testing meter is further described as follows:

The Newton interpolation polynomial is as follows:

First order difference $f[x_i, x_{i+1}]$ is:

$$f[x_i, x_{i+1}] = \dfrac{f(x_{i+1}) - f(x_i)}{x_{i+1} - x_i}$$

Second order difference $f[x_i, x_{i+1}, x_{i+2}]$ is:

$$f[x_i, x_{i+1}, x_{i+2}] = \dfrac{f[x_{i+1}, x_{i+2}] - f[x_i, x_{i+1}]}{x_{i+2} - x_i}$$

$x_i$ is the abscissa of the i-th interpolation point, k order difference $f[x_0, x_1, \ldots x_k]$ is:

$$f[x_0, x_1, \ldots, x_k] = \frac{f[x_0, \ldots, x_{k-1}, x_k] - f[x_0, \ldots, x_{k-1}]}{x_k - x_0}$$

$x_k$ is the abscissa of the k-th interpolation point, the k-th degree polynomial is:

$$N_n(x) = f(x_0) + f[x_0, x_1](x - x_0) + \ldots fx\_x\_ \ldots x_n xx\_xx\_ \ldots xx_{n\_}$$

where x is the pointer angle, $N_n(x)$ is the response value of the pointer corresponding to the pointer angle; $\{(x_0, f(x_0)), (x_1, f(x_1)), \ldots, (x_n, f(x_n))\}$ is the set of interpolation points participating in the interpolation, n≥3; $\{x_0, x_1, \ldots, x_n\}$ is the corresponding angle value of the main tick mark of each character area in the coordinate system with the rotation center of the pointer as the coordinate origin, $\{f(x_0), f(x_1), \ldots, f(x_n)\}$ is the number set corresponding to the main tick mark.

One skilled in the art will understand that the embodiment of the present invention as shown in the drawings and described above is exemplary only and not intended to be limiting. It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An adaptive automobile meter detection method based on character segmentation cascade classifier, comprising the steps of:

(a) if the input signal value of testing meter is i, collect a color image of an entire dashboard as an original image, preprocessing a ROI image in the original image to obtain a binary image, extracting precise connected components of pointer in the binary image by contour analysis, processing thinning operation and fitting for the pointer image to obtain a fitting line corresponding to a response value of the pointer at a current position and obtaining a pointer angle $\Delta\varphi^j$ according to the angle of the fitting line;

(b) if i is less than equal to a maximum scale value of the testing meter based on i=i+Q, storing the fitting line corresponding to the response value of the pointer at the current position and repeating step (a), if i is not less than equal to a maximum scale value of the testing meter based on i=i+Q, continuing to step (c), where the initial value of i is 0, Q refers to the display difference between adjacent main scales;

(c) utilizing a character segmentation cascade classifier to process multi-scale detection of the ROI image such that a digit character area on the testing meter is obtained, the character segmentation cascade classifier is constructed by a cascade combination of a HOG/SVM character segmentation two-class classifier, a character filter and a CNN digit classifier;

(d) connecting the rotation center of the pointer to the center of each digit character area and making an extension line, a length of the extension line has a fixed length λ, defining an end point of each extension line as a search center of a tick mark area corresponding to each digit character area respectively; setting each search center as a center of circle, searching for the main tick marks corresponding to each digit character area in the circle having a radius R, obtaining the main tick marks corresponding to each digit character area;

(e) defining the pointer angle as an independent variable, the response value of the pointer as a dependent variable, the angle of the main tick mark and the reading value corresponding to the angle of the main tick mark as an interpolation point, using Newton interpolation polynomial to establish a linear description relationship of Newton interpolation of the testing meter, substituting the pointer angle $\Delta\varphi_j$ into the linear description relationship of Newton interpolation and obtaining the response value of the pointer corresponding to each of the fitting lines stored in step (b), the angle of the main tick mark is: an angle between a connecting line of the main tick marks and a horizontal axis of a coordinate system along a position direction, the connecting line of the main tick marks is a connecting line between a coordinate of the main tick marks in the coordinate system with the rotation center of the pointer as the coordinate origin and the coordinate origin;

(f) calculating the error value between each input signal value and the response value of the pointer corresponding to each input signal value of the testing meter, if the error value is smaller than a standard threshold of error, the testing meter is classified as pass, if the error value is larger than the standard threshold of error, the testing meter is classified as fail.

2. The adaptive automobile meter detection method based on character segmentation cascade classifier according to claim 1, wherein in the step (a), precise connected component of pointer is obtained by the steps of:

processing rough extraction of the pointer for the binary image with the largest area after binarization marking to obtain a rough extracted image of the pointer;

extracting the contour of the rough extracted image of the pointer to obtain the contour image;

processing fitting line operation of the contour image by Probabilistic Hough Transform algorithm to obtain the contour image with contour fitting line; and searching the contour image with contour fitting line for an inner contour with the largest area and extracting image of the connected components corresponding to the inner contour with the largest area as the precise connected components image of the pointer.

3. The adaptive automobile meter detection method based on character segmentation cascade classifier according to claim 1, wherein in the step (c), the HOG/SVM character segmentation two-class classifier processes multi-scale detection of ROI image to obtain multiple digit character candidate areas, the character filter processes division of the elements in each of the digit character candidate areas and filtering out non-character elements to obtain character elements in each of the digit character candidate areas, the CNN digit classifier processes identification of the character elements in each of the digit character candidate areas to obtain a reading value of each of the digit character candidate areas, then utilizes the reading value of each of the digit character candidate areas for screening the digit character candidate areas to obtain the plurality of digit character areas.

4. The adaptive automobile meter detection method based on character segmentation cascade classifier according to claim 3, wherein the HOG/SVM character segmentation two-class classifier is obtained by the steps of:

making a training sample set which comprises a positive sample set and a negative sample set, wherein the positive sample set comprises sample images of digit character area in different types of dashboard images; and the negative sample set comprises sample images of pointer image elements, indicator light image elements and tick mark image elements in different types of dashboard images;

normalizing a size of all sample images in the training sample set to obtain a training sample set with sample images of the same size;

extracting the HOG feature for each of the sample images of the same size in the training sample set, generating a feature vector matrix, and labelling positive sample as 1 and negative sample as 0 to obtain sample labels for all of the sample images; and inputting the feature vector matrix and all of the sample labels into a linear SVM and performing training to obtain the HOG/SVM character segmentation two-class classifier.

5. The adaptive automobile meter detection method based on character segmentation cascade classifier according to claim 3, the character filter processes a filtering method comprising the steps of:

performing threshold segmentation for each of the digit character candidate areas to obtain a plurality of connected components elements;

labelling each of the connected components elements and determining a minimum enclosing rectangle for each of the contour of the connected components elements; and screening each of the connected components elements respectively to obtain character elements in each of the digit character candidate areas, wherein screening conditions requires that: each of the connected components elements has a height greater than 12 pixels and smaller than 30 pixels; a pixel ratio of the connected components element to its minimum enclosing rectangle is less than 0.8; and an aspect ratio of the minimum enclosing rectangle of the connected components element is greater than 0.1 and smaller than 0.85.

6. The adaptive automobile meter detection method based on character segmentation cascade classifier according to claim 3, the CNN digit classifier is obtained by the steps of:

building a digit data set of automobile meter, wherein the digit data set comprises a training set and a testing set;

labeling each image in the training set and in the testing set respectively to obtain image sets under 10 classification;

normalizing an image size in the training set to 28*28 pixel; and then inputting the testing set and the training set into the CNN network and performing training to obtain the CNN digit classifier.

7. The adaptive automobile meter detection method based on character segmentation cascade classifier according to claim 6, the CNN network employs a LeNet5 framework and has 7 layers, wherein a first layer is an input layer, which is an input layer for images having a size of 28*28 pixel;

wherein a second layer is a convolutional layer which comprises 32 convolutional kernels and each of the convolutional kernels has a size of 3*3 pixel, wherein the convolutional layer employs rectified linear units to activate activation function;

wherein a third layer is a pooling layer, which uses maximum pooling to reduce feature vectors of convolutional layer outputs and a size of a sampling kernel is 2*2, wherein a fourth layer is a convolutional layer which comprises 64 convolutional kernels and each of the convolutional kernels has a size of 3*3 pixel, wherein the convolutional layer employs rectified linear units to activate activation function;

wherein a fifth layer is a pooling layer which has identical construction as the third layer;

wherein a sixth layer is a fully connected layer comprising 120 neurons and employing rectified linear units to activate activation function;

wherein a seventh layer is a fully connected layers comprising 10 neurons and employing multiple logistic regression to activate activation function.

8. The adaptive automobile meter detection method based on character segmentation cascade classifier according to claim 3, a method of utilizing the reading value of each of the digit character candidate areas for screening the digit character candidate areas comprises the steps of:

comparing the reading value of each of the digit character candidate areas with a digit set of the testing meter, then determining the reading value belonging to the digit set of the testing meter as the digit character area.

9. The adaptive automobile meter detection method based on character segmentation cascade classifier according to claim 1, wherein the coordinates of the search center of each of the digit character areas are obtained by:

combining a line equation and a circle equation to obtain coordinates of the two intersection points, and use the coordinates of the intersection point with a greater distance from the rotation center of the testing meter as coordinates of the search center, wherein the line equation is an equation of connecting the rotation center of the pointer with the center of the digit character area;

wherein the circle equation is an equation having a center equal to the center of the digit character area and a radius of $\lambda$.

10. The adaptive automobile meter detection method based on character segmentation cascade classifier according to claim 1, comprising a method of searching for the main tick marks corresponding to each of the digit character areas which comprises the steps of:

searching for a largest connected components in the circle area as an i-th main tick mark of the testing meter, and determining the coordinates of a centroid of the main tick mark in the image coordinate system as an estimated position of the main tick mark.

11. The adaptive automobile meter detection method based on character segmentation cascade classifier according to claim 2, wherein in the step (c), the HOG/SVM character segmentation two-class classifier processes multi-scale detection of ROI image to obtain multiple digit character candidate areas, p1 the character filter processes division of the elements in each of the digit character candidate areas and filtering out non-character elements to obtain character elements in each of the digit character candidate areas, the CNN digit classifier processes identification of the character elements in each of the digit character candidate areas to obtain a reading value of each of the digit character candidate areas, then utilizes the reading value of each of the digit character candidate areas for screening the digit character candidate areas to obtain the plurality of digit character areas.

12. The adaptive automobile meter detection method based on character segmentation cascade classifier according to claim 11, wherein the HOG/SVM character segmentation two-class classifier is obtained by the steps of:
- making a training sample set which comprises a positive sample set and a negative sample set, wherein the positive sample set comprises sample images of digit character area in different types of dashboard images; and the negative sample set comprises sample images of pointer image elements, indicator light image elements and tick mark image elements in different types of dashboard images;
- normalizing a size of all sample images in the training sample set to obtain a training sample set with sample images of the same size;
- extracting the HOG feature for each of the sample images of the same size in the training sample set, generating a feature vector matrix, and labelling positive sample as 1 and negative sample as 0 to obtain sample labels for all of the sample images; and
- inputting the feature vector matrix and all of the sample labels into a linear SVM and performing training to obtain the two-class classifier of HOG/SVM character segmentation two-class classifier.

13. The adaptive automobile meter detection method based on character segmentation cascade classifier according to claim 12, the character filter processes a filtering method comprising the steps of:
- performing threshold segmentation for each of the digit character candidate areas to obtain a plurality of connected components elements;
- labelling each of the connected components elements and determining a minimum enclosing rectangle for each of the contour of the connected components elements; and
- screening each of the connected components elements respectively to obtain character elements in each of the digit character candidate areas,
- wherein screening conditions requires that: each of the connected components elements has a height greater than 12 pixels and smaller than 30 pixels; a pixel ratio of the connected components element to its minimum enclosing rectangle is less than 0.8; and an aspect ratio of the minimum enclosing rectangle of the connected components element is greater than 0.1 and smaller than 0.85.

14. The adaptive automobile meter detection method based on character segmentation cascade classifier according to claim 13, the CNN digit classifier is obtained by the steps of:
- building a digit data set of automobile meter, wherein the digit data set comprises a training set and a testing set;
- labeling each image in the training set and in the testing set respectively to obtain image sets under 10 classification;
- normalizing an image size in the training set to 28*28 pixel; and
- then inputting the testing set and the training set into the CNN network and performing training to obtain the CNN digit classifier.

15. The adaptive automobile meter detection method based on character segmentation cascade classifier according to claim 14, the CNN network employs a LeNet5 framework and has 7 layers,
- wherein a first layer is an input layer, which is an input layer for images having a size of 28*28 pixel;
- wherein a second layer is a convolutional layer which comprises 32 convolutional kernels and each of the convolutional kernels has a size of 3*3 pixel, wherein the convolutional layer employs rectified linear units to activate activation function;
- wherein a third layer is a pooling layer, which uses maximum pooling to reduce feature vectors of convolutional layer outputs and a size of a sampling kernel is 2*2,
- wherein a fourth layer is a convolutional layer which comprises 64 convolutional kernels and each of the convolutional kernels has a size of 3*3 pixel, wherein the convolutional layer employs rectified linear units to activate activation function;
- wherein a fifth layer is a pooling layer which has identical construction as the third layer;
- wherein a sixth layer is a fully connected layer comprising 120 neurons and employing rectified linear units to activate activation function;
- wherein a seventh layer is a fully connected layers comprising 10 neurons and employing multiple logistic regression to activate activation function.

16. The adaptive automobile meter detection method based on character segmentation cascade classifier according to claim 15, a method of utilizing the reading value of each of the digit character candidate areas for screening the digit character candidate areas comprises the steps of:
- comparing reading value of each of the digit character candidate areas with a digit set of the testing meter,
- then determining the reading value belonging to an area of the digit set of the testing meter as the digit character area.

17. The adaptive automobile meter detection method based on character segmentation cascade classifier according to claim 16, wherein the coordinates of the search center of each of the digit character areas are obtained by:
- combining a line equation and a circle equation to obtain coordinates of the two intersection points, and use the coordinates of the intersection point with a greater distance from the rotation center of the testing meter as coordinates of the search center,
- wherein the line equation is an equation of connecting the rotation center of the pointer with the center of the digit character area;
- wherein the circle equation is an equation having a center equal to the center of the digit character area and a radius of $\lambda$.

18. The adaptive automobile meter detection method based on character segmentation cascade classifier according to claim 17, comprising a method of searching for the main tick marks corresponding to each of the digit character areas which comprises the steps of:
- searching for a largest connected components in the circle area as the i-th main tick mark of the testing meter, and determining the coordinates of a centroid of the main tick mark in the image coordinate system as an estimated position of the main tick mark.

19. The adaptive automobile meter detection method based on character segmentation cascade classifier according to claim 10, wherein in the step (c),
- the HOG/SVM character segmentation two-class classifier processes multi-scale detection of ROI image to obtain multiple digit character candidate areas,
- the character filter processes division of the elements in each of the digit character candidate areas and filtering out non-character elements to obtain character elements in each of the digit character candidate areas,
- the CNN digit classifier processes identification of the character elements in each of the digit character candidate areas to obtain a reading value of each of the digit character candidate areas, then utilizes the reading value of each of the digit character candidate areas for screening the digit character candidate areas to obtain the plurality of digit character areas.

20. The adaptive automobile meter detection method based on character segmentation cascade classifier according to claim 19, wherein the HOG/SVM character segmentation two-class classifier is obtained by the steps of:

making a training sample set which comprises a positive sample set and a negative sample set, wherein the positive sample set comprises sample images of digit character area in different types of dashboard images; and the negative sample set comprises sample images of pointer image elements, indicator light image elements and tick mark image elements in different types of dashboard images;

normalizing a size of all sample images in the training sample set to obtain a training sample set with sample images of the same size;

extracting the HOG feature for each of the sample images of the same size in the training sample set, generating a feature vector matrix, and labelling positive sample as 1 and negative sample as 0 to obtain sample labels for all of the sample images; and inputting the feature vector matrix and all of the sample labels into a linear SVM and performing training to obtain the HOG/SVM character segmentation two-class classifier, wherein the character filter processes a filtering method comprising the steps of:

performing threshold segmentation for each of the digit character candidate areas to obtain a plurality of connected components elements;

labelling each of the connected components elements and determining a minimum enclosing rectangle for each of the contour of the connected components elements; and screening each of the connected components elements respectively to obtain character elements in each of the digit character candidate areas, wherein screening conditions requires that: each of the connected components elements has a height greater than 12 pixels and smaller than 30 pixels; a pixel ratio of the connected components element to its minimum enclosing rectangle is less than 0.8; and an aspect ratio of the minimum enclosing rectangle of the connected components element is greater than 0.1 and smaller than 0.85, wherein the CNN digit classifier is obtained by the steps of:

building a digit data set of automobile meter, wherein the digit data set comprises a training set and a testing set;

labeling each image in the training set and in the testing set respectively to obtain image sets under 10 classification;

normalizing an image size in the training set to 28*28 pixel; and then inputting the testing set and the training set into the CNN network and performing training to obtain the CNN digit classifier.

* * * * *